United States Patent
Son et al.

(10) Patent No.: US 8,605,138 B2
(45) Date of Patent: Dec. 10, 2013

(54) IMAGE DISPLAY DEVICE AND DRIVING METHOD THEREOF

(75) Inventors: Hyeonho Son, Gyeonggi-do (KR); Euitae Kim, Gyeonggi-do (KR); Joonyoung Park, Gyeonggi-do (KR); Jeongki Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 254 days.

(21) Appl. No.: 12/955,383

(22) Filed: Nov. 29, 2010

(65) Prior Publication Data

US 2011/0273439 A1 Nov. 10, 2011

(30) Foreign Application Priority Data

May 7, 2010 (KR) .................. 10-2010-0042969

(51) Int. Cl.
*H04N 13/04* (2006.01)
*G06T 15/00* (2011.01)

(52) U.S. Cl.
USPC .......................................... 348/51; 345/419

(58) Field of Classification Search
USPC ............................................ 348/51; 345/419
See application file for complete search history.

(56) References Cited

U.S. PATENT DOCUMENTS

| | | | |
|---|---|---|---|
| 7,295,173 B2 * | 11/2007 | Itoh et al. .................. | 345/63 |
| 2004/0239698 A1 | 12/2004 | Kamada et al. | |
| 2005/0156842 A1 | 7/2005 | Kato | |
| 2007/0236439 A1 | 10/2007 | Chen et al. | |
| 2008/0012814 A1 | 1/2008 | Kim | |
| 2008/0316303 A1 | 12/2008 | Chiu et al. | |
| 2009/0109247 A1 * | 4/2009 | Kimura .................. | 345/690 |
| 2009/0237495 A1 | 9/2009 | Kawahara | |
| 2009/0273556 A1 * | 11/2009 | Shimoshikiryoh et al. ..... | 345/99 |
| 2010/0066820 A1 | 3/2010 | Park et al. | |
| 2011/0273439 A1 | 11/2011 | Son et al. | |

FOREIGN PATENT DOCUMENTS

| | | | |
|---|---|---|---|
| EP | 2071556 A | | 6/2009 |
| EP | 2 327 228 A2 | | 6/2011 |
| KR | 10-2010-0032284 A | | 3/2010 |
| TW | 200501035 B | | 1/2005 |

OTHER PUBLICATIONS

Office Action dated Sep. 11, 2012, for corresponding application DE 10 2010 060 621.9.
Taiwan—Office Action for Taiwanese Patent Application No. TW 099139614—Issued on Apr. 19, 2013—Including English Translation of Examination Statement.
KIPO—Office Action for Korean Patent Application No. KR 10-2010-0042969—Issued on May 3, 2013.
British Office Action dated Aug. 6, 2013 for International Application No. GB1017497.7.

* cited by examiner

*Primary Examiner* — Sath V Perungavoor
*Assistant Examiner* — Peter D Le
(74) *Attorney, Agent, or Firm* — Morgan, Lewis & Bockius LLP (57) ABSTRACT

A method of driving an image display device comprises inserting a reset frame displaying black data between neighboring data frames alternately displaying left-eye data and right-eye data; reflecting gray-scale information of an (n−2)th data frame in a reset frame corresponding to an (n−1)th frame through a predetermined data calculating operation; detecting a data variation between the (n−1)th reset frame and an nth data frame, reading a compensation value corresponding to the detection result from a lookup table, and modulating input data of the nth data frame using the read compensation value; and inverting the polarity of the modulated data according to N frame inversion (N is a multiple of 4) and applying the data having the inverted polarity to a display panel.

12 Claims, 10 Drawing Sheets

FIG. 1

(RELATED ART)

(A) original data stream (B) data stream to which ODC applied

FIG. 2

(RELATED ART)

| Frame | 1F | 2F | 3F | 4F | 5F | 6F | 7F | 8F | |
|---|---|---|---|---|---|---|---|---|---|
| BDI | L | B | R | B | L | B | R | B | |
| change in frame polarity | + | − | + | − | + | − | + | − | 1 Frame Inversion |
| | + | + | − | − | + | + | − | − | 2 Frame Inversion |
| | + | + | + | + | − | − | − | − | 4 Frame Inversion |

IMAGE DISPLAY DEVICE AND DRIVING METHOD THEREOF

This application claims the benefit of Korean Patent Application No. 10-2010-0042969 filed on May 7, 2010, which is incorporated herein by reference for all purposes as if fully set forth herein.

BACKGROUND

1. Field

This document relates to an image display device and a driving method thereof for improving picture quality.

2. Related Art

With the advancement of various image processing techniques, image display systems capable of selectively displaying 2D images 3D images are developed.

Methods of generating 3D images are divided into a stereoscopic technique and an autostereoscopic technique.

The stereoscopic technique uses disparity images of left and right eyes, which have high 3D effect, and includes a stereoscopic method and an autostereoscopic method which are practically used. The autostereoscopic method provides an optical plate such as a parallax barrier for separating optical axes of left and right disparity images from each other before or behind a display screen. The stereoscopic method displays left and right disparity images having different polarization directions on a liquid crystal display panel and generates 3D images by using polarizing glasses or liquid crystal shutter glasses.

The stereoscopic method is divided into a first polarizing filter method using a pattern retarder film and polarizing glasses, a second polarizing filter method using a switching liquid crystal layer and polarizing glasses, and a liquid crystal shutter glasses method. In the first and second polarizing filter methods, 3D images have low transmissivity due to the pattern retarder film or the switching liquid crystal layer, which is arranged on a liquid crystal display panel to function as a polarizing filter.

The liquid crystal shutter glasses method alternately displays left-eye and right-eye images on a display frame by frame and opens/closes left-eye and right-eye shutters of liquid crystal shutter glasses in synchronization with the display timing to generate a 3D image. The liquid crystal shutter glasses open only the left-eye shutter for an nth frame period in which a left-eye image is displayed and open only the right-eye shutter for an (n+1)th frame period in which a right-eye image is displayed to generate binocular disparity in a time division manner.

In the above image display systems, a liquid crystal display (LCD) is widely used as an image display device. The LCD, a hold type display device, holds data charged in a previous frame right before new data is written because of maintenance characteristic of liquid crystal. The response of liquid crystal is delayed according to data writing. The response delay of liquid crystal causes motion blurring when a left-eye image is changed to a right-eye image or when a right-eye image is changed to a left-eye image while the LCD generates a 3D image to result in 3D crosstalk in the form of a ghost.

Figure 1:
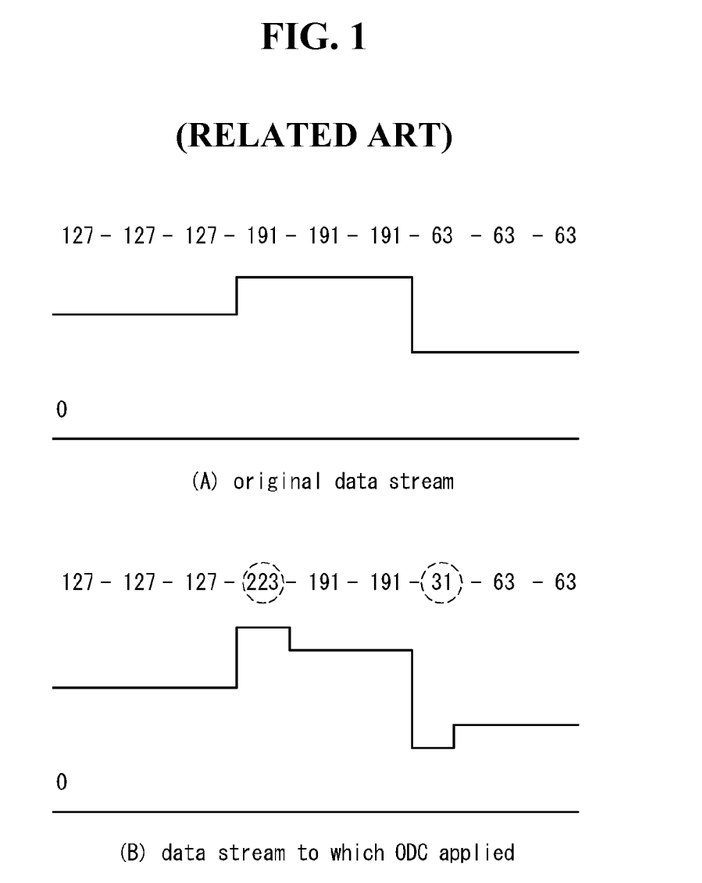
FIG. 1 is a view for explaining a conventional over driving control (ODC) method.

Various methods for improving the response characteristic of liquid crystal for 2D images are known. Over driving control (ODC) compares previous frame data and current frame data to each other, detects a data variation according to the comparison result, reads a compensation value corresponding to the data variation from a memory and modulates input data with the read compensation value. Referring to FIG. 1, the ODC modulates the current frame data into "223" larger than "191" when the previous frame data is "127" and the current frame data is "191" and modulates the current frame data into "31" smaller than "63" when the previous frame data is "191" and the current frame data is "63" so as to improve the response characteristic of liquid crystal. Black data insertion (BDI) inserts a black frame between neighboring frames to improve motion blurring to thereby enhance the response characteristic of liquid crystal.

Figure 2:
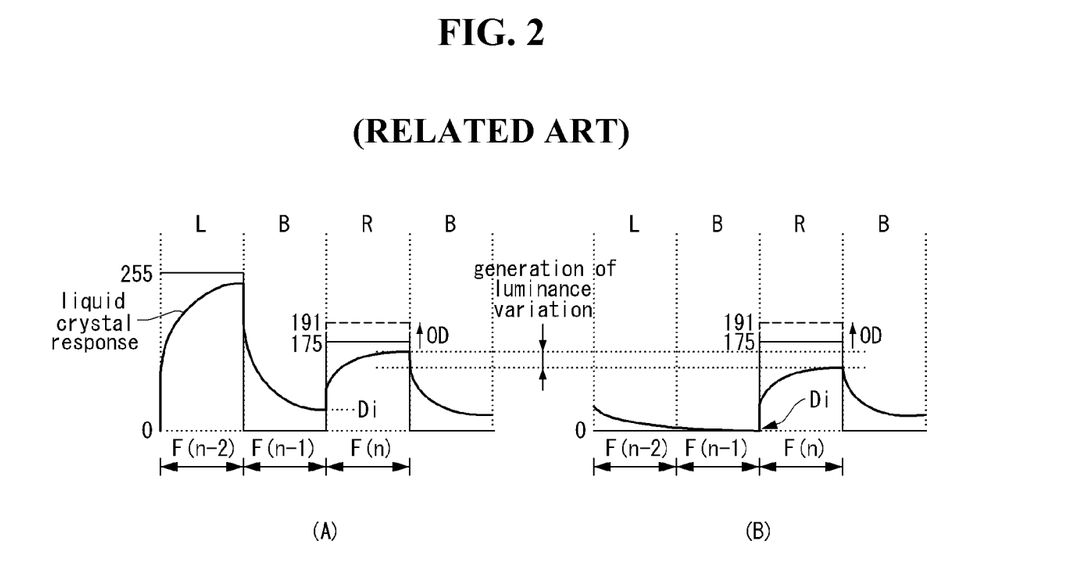
FIG. 2 illustrates a luminance deviation generated when a 3D image is produced.

To improve the 3D crosstalk, it is considered to apply the above-described methods for improving the response characteristic of liquid crystal to image display devices, as shown in FIG. 2. In FIG. 2, "L" represents a left-eye data frame displaying a left-eye image, "R" represents a right-eye data frame displaying a right-eye image, and "B" denotes a black data frame displaying a black image.

However, the black data frame B is located before the left-eye data frame L or right-eye data frame R in FIG. 2, and thus it is difficult to effectively improve the 3D crosstalk using the existing ODC logic and compensation values. For example, when the left-eye data frame L, the black data frame B, and the right-eye data frame R respectively correspond to the (N−2)th frame F(n−2), the (n−1)th frame F(n−1), and the nth frame F(N), a variation in the luminance of the nth frame F(n) to which the ODC is applied is generated between a case (A) where target gray-scale values of the frames are "255", "0" and "175" and a case (B) where the target gray-scale values of the frames are "0", "0" and "175". This is because liquid crystal rises such that the initial luminance Di of the nth frame F(n) in the case (A) is different from the initial luminance Di of the nth frame F(n) in the case (B) due to a response delay of liquid crystal even when the same compensation value (that is, "191") is applied with reference to the target gray-scale value "0" of the (n−1)th frame F(n−1) in order to achieve the target gray-scale value "175" of the nth frame F(n). The response of liquid crystal is proportional to a gray-scale difference between the (n−2)th frame F(n−2) and the (n−1)th frame F(n−1), and thus the initial luminance Di in the case (A) is higher than the initial luminance Di in the case (B).

To effectively remove the 3D crosstalk without causing the aforementioned luminance variation when 3D images are generated, gray-scale information about the (n−2)th frame F(n−2) has to be considered when data of the nth frame F(n) is ODC-modulated in relation to the (n−1)th frame F(−1).

SUMMARY

An aspect of this document is to provide an image display device and a driving method thereof for removing 3D crosstalk without causing a luminance deviation when generating a 3D image.

In an aspect, a method of driving an image display device comprises inserting a reset frame displaying black data between neighboring data frames alternately displaying left-eye data and right-eye data; reflecting gray-scale information of an (n−2)th data frame in a reset frame corresponding to an (n−1)th frame through a predetermined data calculating operation; detecting a data variation between the (n−1)th reset frame and an nth data frame, reading a compensation value corresponding to the detection result from a lookup table, and modulating input data of the nth data frame using the read compensation value; and inverting the polarity of the modulated data according to N frame inversion (N is a multiple of 4) and applying the data having the inverted polarity to a display panel.

The gray-scale information reflected in the (n−1)th reset frame may be calculated as a gray-scale value corresponding to 1/k (k is a positive integer greater than 2) of the input gray-scale value of the (n−2)th data frame in the data calculating operation.

The gray-scale information reflected in the (n−1)th reset frame may be calculated as a gray-scale value corresponding to 1/j (j is a positive integer greater than 4) of the input gray-scale value of the (n−2)th data frame in the data calculating operation.

The data of the data frame may be calculated as a gray-scale value obtained by adding a predetermined gray-scale shift value to 1/k of the input gray-scale value.

The modulating of the input data of the nth data frame may comprise selecting a first region of the lookup table, which is defined as a data accessible region, through the data calculating operation and ODC-modulating input data corresponding to the nth data frame by using compensation values included in the first region when the current frame corresponds to the nth data frame; and selecting a second region of the lookup table, which is defined as a data accessible region, through the data calculating operation and modulating the data reflected in the (n−1)th reset data into a black gray scale by using a compensation value included in the second region when the current frame corresponds to the (n−1)th reset frame.

The compensation value included in the second region may correspond to a minimum gray-scale value.

The first region may b located in the left half of the lookup table and the second region may be located in the upper half of the lookup table.

The first region may be located in part of the left side of the lower half of the lookup table, the second region may be located in part of the right side of the upper half of the lookup table, and the first region may not be overlapped with non-modulation regions arranged in a diagonal direction and at the bottom in the lookup table and the second region.

In another aspect, an image display device comprises a 3D processor inserting a reset frame displaying black data between neighboring data frames alternately displaying left-eye data and right-eye data; a calculating unit reflecting gray-scale information of an (n−2)th data frame in a reset frame corresponding to an (n−1)th frame through a predetermined data calculating operation; a data modulator detecting a data variation between the (n−1)th reset frame and an nth data frame, reading a compensation value corresponding to the detection result from a lookup table, and modulating input data of the nth data frame using the read compensation value; and a data driver inverting the polarity of the modulated data according to N frame inversion (N is a multiple of 4) and applying the data having the inverted polarity to a display panel.

BRIEF DESCRIPTION OF THE DRAWINGS

The implementation of this document will be described in detail with reference to the following drawings in which like numerals refer to like elements.

DETAILED DESCRIPTION

Hereinafter, an implementation of this document will be described in detail with reference to FIGS. 3 through 11.

Figure 3:
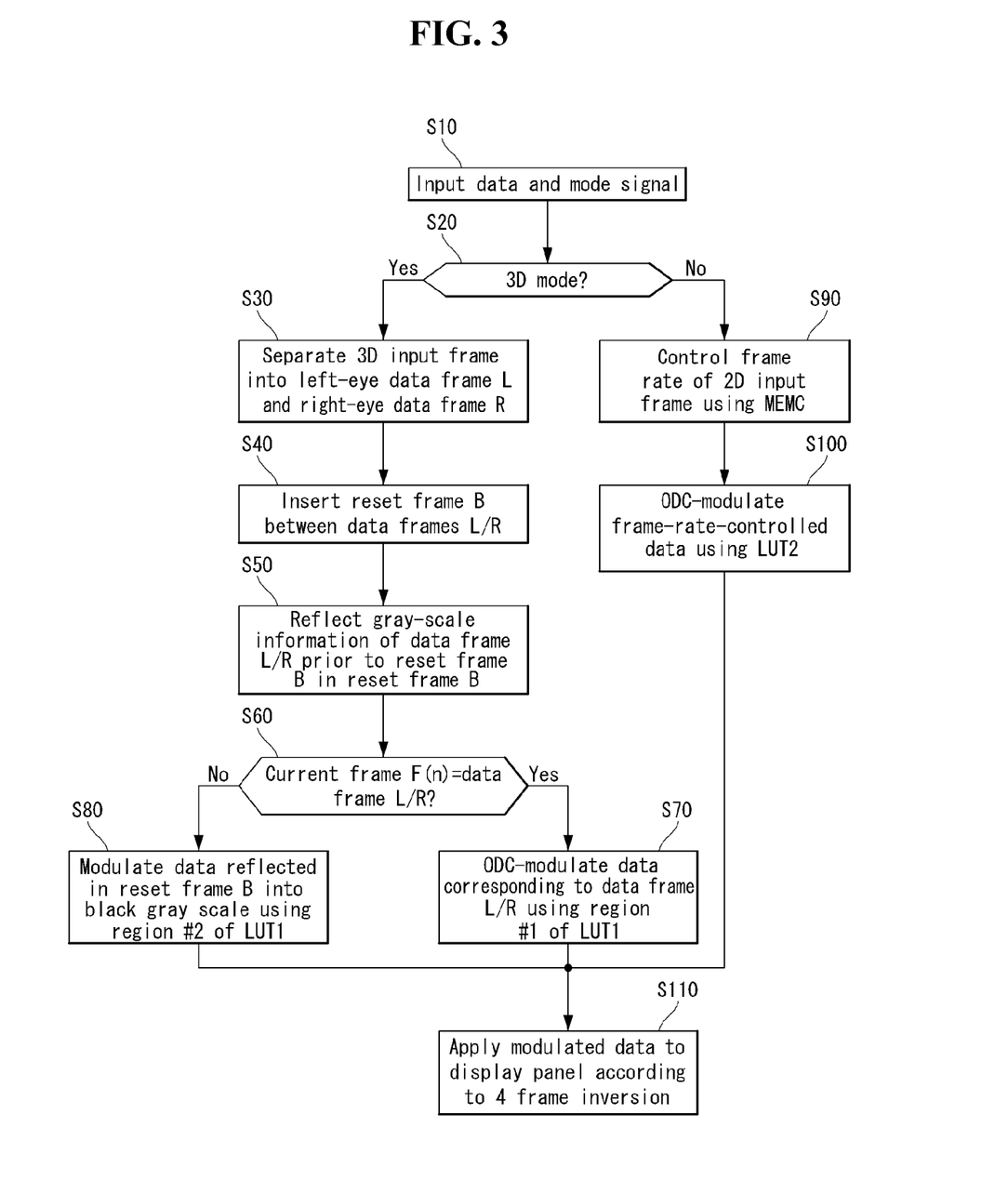
FIG. 3 is a flowchart showing an implementation of a method of driving an image display device.
Figure 4:
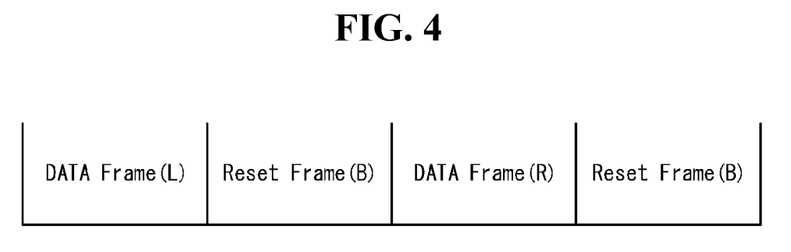
FIG. 4 illustrates insertion of a reset frame between data frames.
Figure 5:
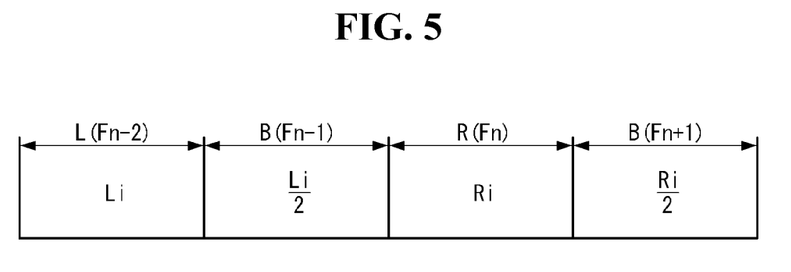
FIG. 5 illustrates an exemplary operation of reflecting gray-scale information of a previous data frame in a reset frame.
Figure 6:
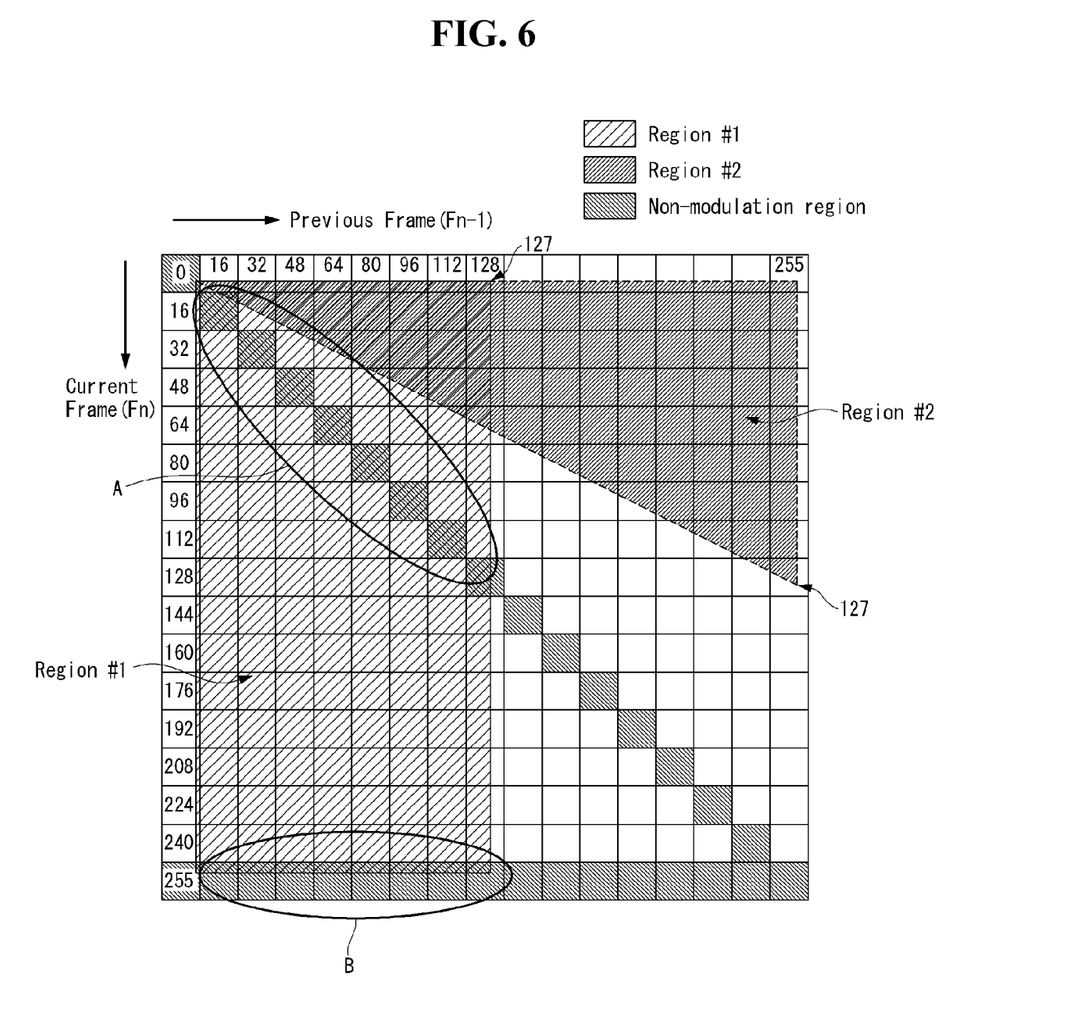
FIG. 6 illustrates an exemplary first lookup table corresponding to FIG. 5.
Figure 7:
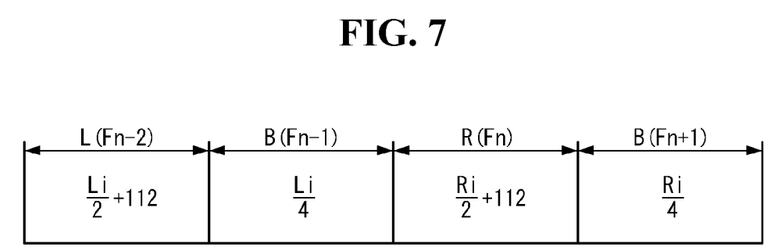
FIG. 7 illustrates another exemplary operation of reflecting gray-scale information of a previous data frame in a reset frame.
Figure 8:
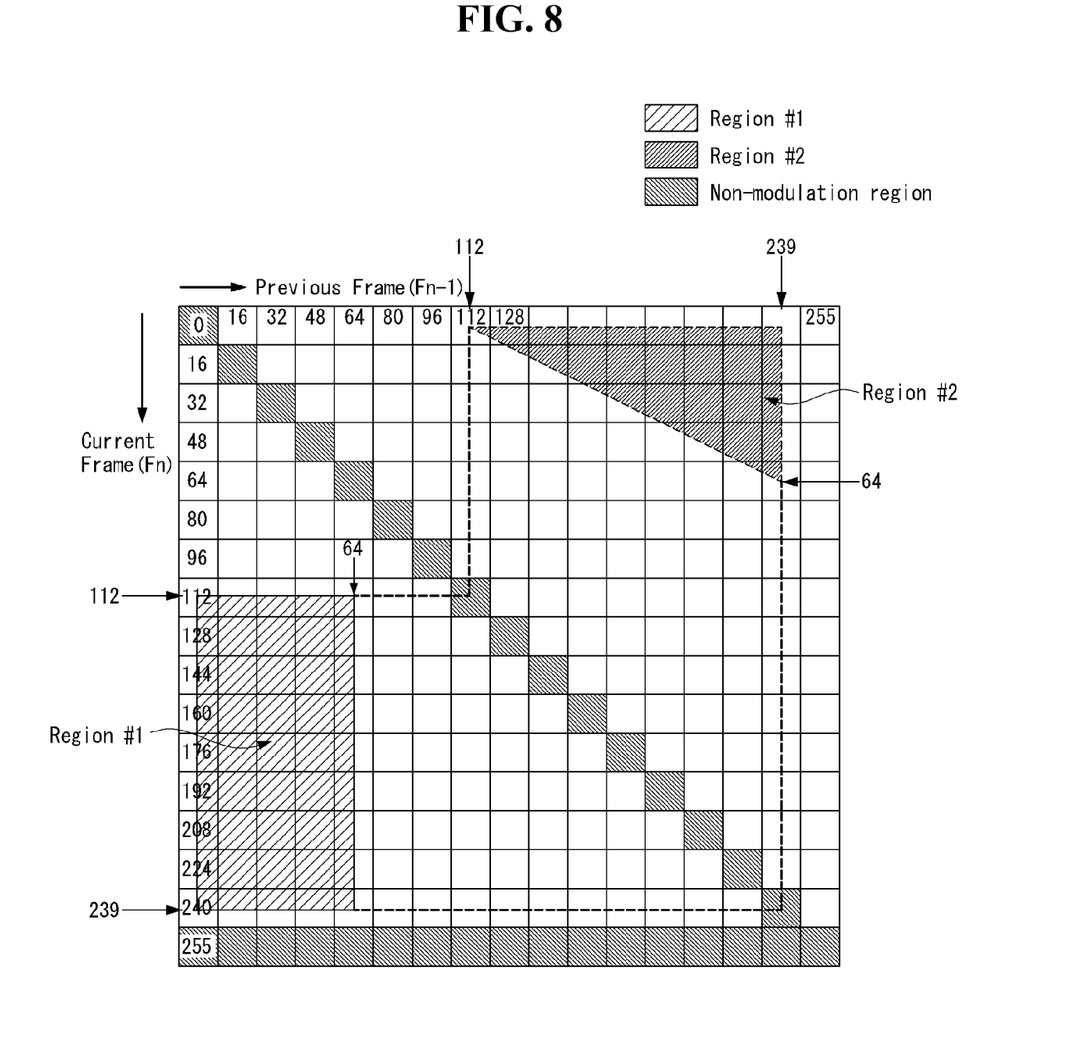
FIG. 8 illustrates an exemplary first lookup table corresponding to FIG. 7.

FIG. 3 is a flowchart showing an implementation of a method of driving an image display device and FIG. 4 illustrates insertion of a rest frame between data frames. FIGS. 5 and 7 illustrate exemplary operations of reflecting gray-scale information of a previous data frame in a reset frame, and FIGS. 6 and 8 illustrate exemplary first look-up tables respectively corresponding to FIGS. 5 and 7.

Referring to FIG. 3, it is determined whether a current driving mode is a 3D mode with reference to an input mode signal in operations S10 and S20.

When it is determined that the current driving mode corresponds to the 3D mode in operation S20, 3D input frames composed of 3D data inputted from an external video source are separated into left-eye data frames L for displaying left-eye images and right-eye data frames R for displaying right-eye images in operation S30. A black data frame for displaying a black image, that is, a reset frame B, is inserted between neighboring data frames L and R, as shown in FIG. 4, in operation S40. An input frame frequency is multiplied by four or more through the aforementioned data separating and inserting operations. For example, a frame frequency of 50 Hz is multiplied to 200 Hz and a frame frequency of 60 Hz is multiplied to 240 Hz.

Gray-scale information of the data frame L/R prior to each reset frame B is reflected in the reset frame B through a data calculating operation in operation S50. That is, data of the nth data frame is modulated in relation to the (n−1)th frame corresponding to a reset frame B with reference to gray-scale information of the (n−2)th data frame and a compensation value is flexibly varied according to the gray-scale information of the (n−2)th data frame in consideration of a response delay of liquid crystal.

The operation of reflecting the gray-scale information of the data frame L/R prior to the reset frame B in the reset frame B may be performed in various manners. For example, if the (n−2)th frame corresponds to the left-eye data frame L, the (n−1)th frame corresponds to the reset frame B, the nth frame corresponds to the right-eye data frame R, and the (n+1)th frame corresponds to the reset frame B, data reflected in the (n−1)th reset frame B is calculated as a gray-scale value Li/k (k is a positive integer greater than 2), which corresponds to 1/k of the (n−2)th left-eye input gray-scale value Li, and data reflected in the (n+1)th reset frame B is calculated as a gray-scale value Ri/k corresponding to 1/k of the nth right-eye input gray-scale value Ri. Here, "1/k" defines a data accessible region in an over driving control (ODC) lookup table as shown in FIG. 6. When input data is 8-bit data and "1/k" is set to "1/2", as shown in FIG. 5, for example, the data accessible region in the lookup table of FIG. 6 is reduced to part of a base region. As "k" increases, the data accessible region in the lookup table decreases.

Alternatively, when the (n−2)th, (n−1)th, nth and (n+1)th frames respectively correspond to the left-eye data frame L, the reset frame B, the right-eye data frame R and the reset frame B, data reflected in the (n−1)th reset frame B is calculated as a gray-scale value Li/j (j is a positive integer greater than 4), which corresponds to 1/j of the (n−2)th left-eye input gray-scale value Li, and data reflected in the (n+1)th reset data B is calculated as a gray-scale value Ri/j corresponding to j/1 of the nth right-eye input gray-scale value Ri. Furthermore, data of the left-eye and right-eye data frames L and R are calculated as values different from the input gray-scale values. That is, the data of the left-eye data frame L is calculated as (Li/k)+α, which is obtained by adding a predetermined gray-scale shift value 'α' to Li/k, and the data of the right-eye data frame R is calculated as (Ri/k)+α, which is obtained by adding the gray-scale shift value 'α' to Ri/k. Here, "1/j" and "1/k" define a data accessible region in an ODC lookup table as shown in FIG. 8. When input data is 8-bit data and "1/k", "1/j" and "α" are respectively set to "1/2", "1/4" and "112", for example, the data accessible region in the lookup table of FIG. 8 is reduced to part of a base region.

Referring back to FIG. 3, it is determined whether a current frame corresponds to the data frame L/R or the reset frame B with reference to an input vertical synchronization signal in operation S60.

When the current frame corresponds to the data frame L/R, a region #1 defined as a data accessible region is selected from a first lookup table LUT1 through the aforementioned calculating operation and data corresponding to the data frame L/R is ODC-modulated using compensation values included in the region #1 in operation S70. The first lookup table LUT1 may be implemented as the lookup table shown in FIG. 6 according to the calculating method as shown in FIG. 5 or implemented as the lookup table shown in FIG. 8 according to the calculating method as shown in FIG. 7. In FIG. 6, the data accessible region #1 may be located in the left half of the first lookup table LUT1 according to the calculating method shown in FIG. 5. In FIG. 8, the data accessible region #1 may be located in part of the lower half of the first lookup table LUT1 according to the calculating method shown in FIG. 7. According to the lookup table of FIG. 8, the data accessible region #1 is not overlapped with non-modulation regions located in a diagonal direction and at the bottom and a region #2 for modulating data of the reset frame B, and thus data distortion in ODC modulation can be remarkably reduced. In FIG. 6, "A" and "B" show that the region #1 is overlapped with the non-modulation regions. Here, the non-modulation regions represent regions that do not require ODC modulation due to a data variation between a previous frame and the current frame or regions that cannot be ODC-modulated due to data saturation.

When it is determined that the current frame is the reset frame B in operation S60, a region #2 defined as a data accessible region is selected from the first lookup table LUT1 through the aforementioned operation and data reflected in the reset frame B is modulated into black gray-scale using a compensation value included in the region #2 in operation S80. The compensation value included in the region #2 is set to a minimum gray-scale value for BDI. The first lookup table LUT1 may be implemented as the lookup table shown in FIG. 6 according to the calculating method as shown in FIG. 5 or implemented as the lookup table shown in FIG. 8 according to the calculating method as shown in FIG. 7. In FIG. 6, the data accessible region #2 may be located in the upper half of the first lookup table LUT1 according to the calculating method shown in FIG. 5. In FIG. 8, the data accessible region #2 may be located in part of the right side of the upper half of the first lookup table LUT1 according to the calculating method shown in FIG. 7. According to the lookup table of FIG. 8, the data accessible region #2 is not overlapped with the region #1 for ODC modulation of the data frame R/L, and thus data distortion in data modulation can be remarkably reduced.

When it is determined that the current driving mode is a 2D mode in operation S20, a frame rate of 2D input frames composed of 2D data inputted from an external video source is controlled through a data interpolation method such as motion estimation motion compensation (MEMC) in operation S90. An input frame frequency is multiplied by four or more according to the frame rate control (FRC).

The frame-rate-controlled 2D data is ODC-modulated using compensation values included in a second lookup table LUT2 in operation S100. The ODC modulation method is identical to the modulation methods disclosed in Korean Patent Nos. 10-2001-0032364 and 10-2001-0057119 applied by the Applicant.

The polarity of the modulated 3D data or 2D data is inverted through N (N is a multiple of 4) frame inversion and the polarity-inverted 3D or 2D data is applied to a liquid crystal display panel in operation S110.

Figure 9:
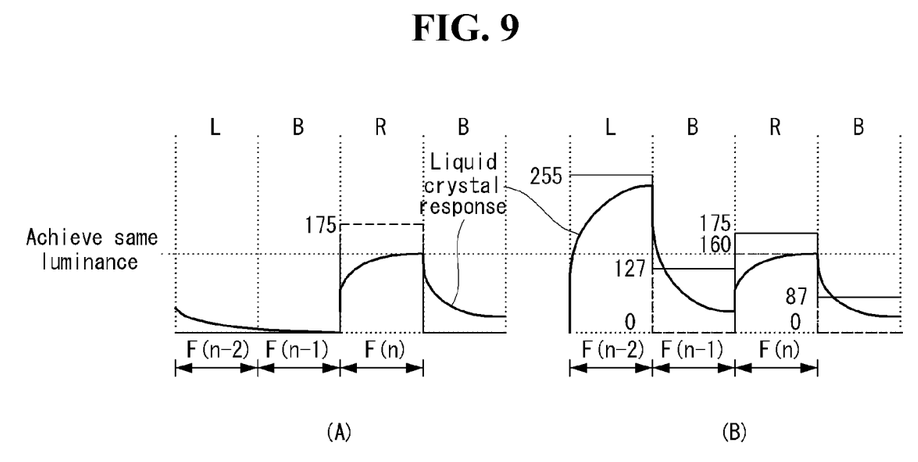
FIG. 9 is a view for explaining the effect of an implementation of the present invention.

FIG. 9 shows the effect of the driving method according to the present invention.

Referring to FIG. 9, when the left-eye data frame L, the reset frame B, and the right-eye data frame R respectively correspond to the (n−2)th frame, the (n−1)th frame, and the nth frame, the luminance in the nth frame F(n) to which the ODC modulation is applied according to the present invention reaches "160" in both a case where target gray-scale values of the (n−2)th, (n−1)th and nth frames are "0", "0" and "175" and a case where the target gray-scale values correspond to "255", "0" and "175". In ODC modulation of the data of the nth frame F(n) in relation to the (n−1)th frame F(n−1), the data is compensated with reference to gray-scale information of the (n−2)th frame F(n−2), which is reflected in the (n−1)th frame F(n−1) (for example, "255" is reflected to calculate "127"), and thus a data compensation range can be flexibly varied according to the gray-scale information of the (n−2)th frame F(n−2). Accordingly, the same luminance "160" is achieved in the above-described two cases.

Figure 10:
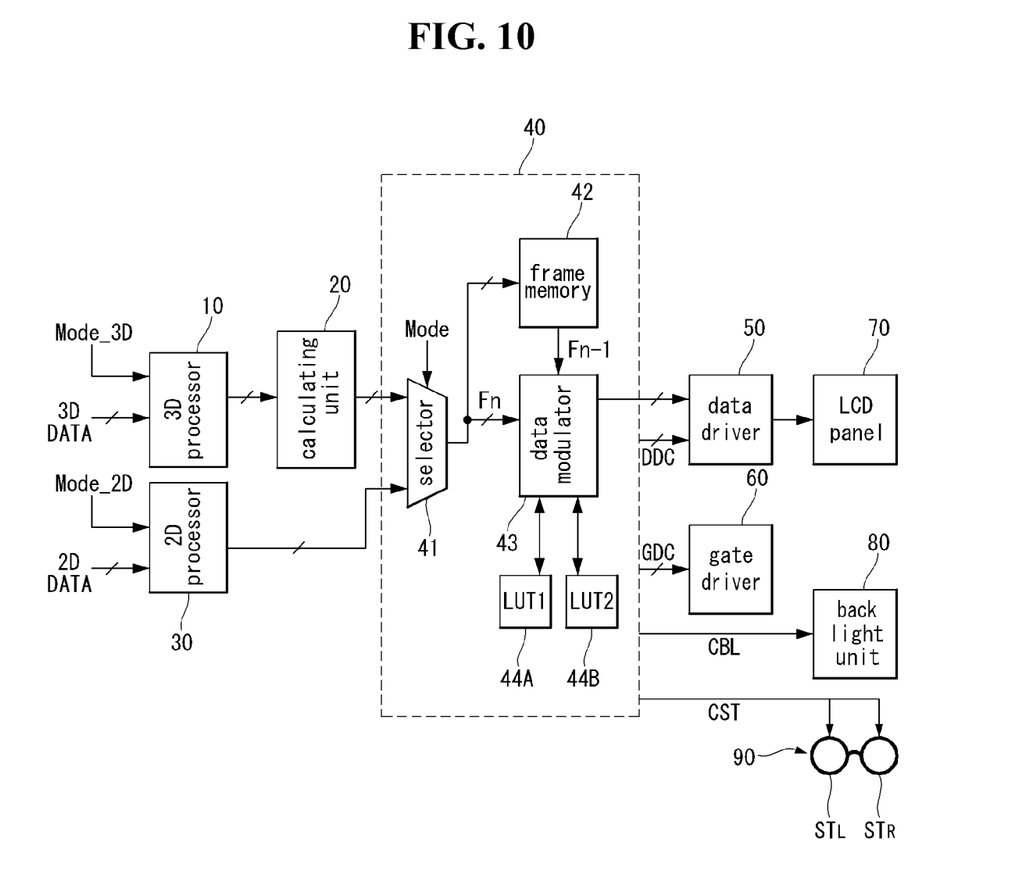
FIG. 10 is a block diagram of an implementation of an image display device.

FIG. 10 illustrates an implementation of an image display device according to the present invention.

Referring to FIG. 10, the image display device includes a 3D processor 10, a calculating unit 20, a 2D processor 30, a timing controller 40, a data driver 50, a gate driver 60, a liquid crystal display (LCD) panel 70, a back light unit 80, and liquid crystal shutter glasses 90.

The 3D processor 10 separates 3D input frames composed of 3D data inputted from an external video source into left-eye data frames L for displaying left-eye images and right-eye data frames R for displaying right-eye images and inserts a black data frame for displaying a black image, that is, a reset frame B, between neighboring data frames to multiply an input frame frequency.

The calculating unit 20 reflects gray-scale information of a data frame prior to each reset frame B in the reset frame B through the above-described calculating method.

The 2D processor 30 controls the frame rate of 2D input frames composed of 2D data inputted from an external video source through data compensation such as MEMC to multiply an input frame frequency.

The timing controller 40 ODC-modulates the input 2D/3D data and provides the modulated data to the data driver 50 in synchronization with the multiplied input frame frequency.

The timing controller 40 generates timing control signals DDC and GDC for controlling operation timing of the data driver 50 and the gate driver 60 based on timing signals (vertical synchronization signal, horizontal synchronization signal, data enable signal, dot clock signal, etc.) inputted from an external system board. The timing controller 40 multiples the data timing control signal DDC and the gate timing control signal GDC to synchronize the data timing control signal DDC and the gate timing control signal GDC with the multiplied input frame frequency. The timing controller 40 generates a back light control signal CBL for controlling tuning on/off timing of the back light unit 80 based on the multiplied input frame frequency. The timing controller 40 generates a shutter control signal CST for controlling the operation of the liquid crystal shutter glasses 90 based on the multiplied input frame frequency.

The timing controller 40 includes a selector 41 for selectively outputting input 2D and 3D data, a frame memory 42, a data modulator 43, and first and second lookup tables 44A and 44B. The selector 41 selectively outputs the 2D data inputted from the 2D processor 30 and the 3D data inputted from the calculating unit 20 according to an external mode signal. The frame memory 42 stores the data received from the selector 41 for one frame period. The first lookup table 44A includes regions #1 and #2 defined as data accessible regions according to the aforementioned calculating operation and partially overlapped with each other or separated from each other. The second lookup table 44B is identical to those disclosed in Korean Patent Nos. 10-2001-0032364 and 10-2001-0057119 applied by the Applicant. Compensation values of the first and second lookup tables 44A and 44B are loaded from an external EEPROM whenever the image display device is provided with power. Compensation values stored in the EEPROM may be updated by a user. The data modulator 43 receives 3D data including data frames L and R and the reset frame B in which gray-scale information of the data frames are reflected and frame-rate-controlled 2D data from the selector 41. If the current frame corresponds to the data frame R/L in the 3D mode, the data modulator 43 selects the region #1 from the first lookup table 44A and ODC-modulates data corresponding to the data frame R/L using compensation values included in the region #1. If the current frame is the reset frame B in the 3D mode, the data modulator 43 selects the region #2 from the first lookup table 44A and modulates data corresponding to the reset frame B into black data using a compensation value included in the region #2, that is, a minimum gray-scale value. The data modulator 43 ODC-modulates the frame-rate-controlled 2D data using compensation values included in the second lookup table 44B in the 2D mode.

Figure 11:
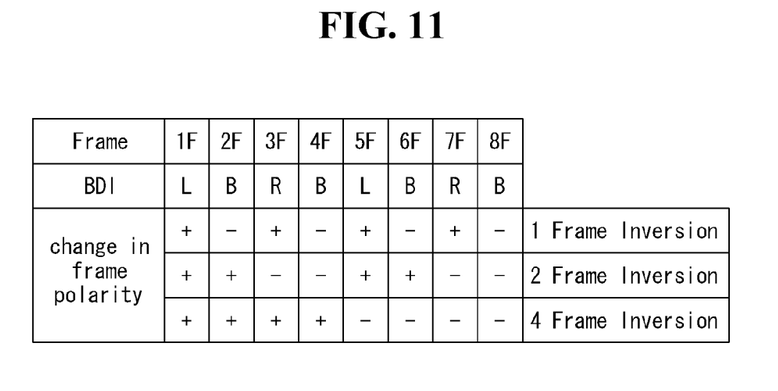
FIG. 11 illustrates data polarity control according to 4 frame inversion.

The data driver 50 converts the modulated 3D data or 2D data received from the timing controller 40 into an analog signal in response to the data control signal DDC, inverts the polarity of the modulated 3D data or 2D data through the N (N is a multiple of 4) frame inversion shown in FIG. 11 and provides the 3D data or 2D data having the inverted polarity to data lines of the LCD panel 70. The polarity of the data is inverted according to the N frame inversion in order to eliminate DC image sticking. A DC voltage is applied to an LCD for a long time, ions with negative charges are moved in the same motion vector direction and ions with positive charges are moved in a motion vector direction opposite to the moving direction of the ions with negative charges and polarized according to the polarity of a field applied to the liquid crystal. The quantity of accumulated ions with negative charges and the quantity of accumulated ions with positive charges increase with the lapse of time. As the quantities of accumulated ions increase, an alignment film is degraded so as to deteriorate the alignment characteristic of liquid crystal. Accordingly, when the DC voltage is applied to the LCD for a long time, image sticking is generated on a displayed image and becomes large with the lapse of time. The image sticking is rapidly generated and becomes severe when the temperature is high or the DC voltage is applied to a liquid crystal layer for a long time. The DC image sticking becomes serious when the polarity of data is inverted for every frame or for every two frames while applying BDI to the data in the 3D mode. As it can be known from FIG. 11, when the polarity of data is inverted according to 1 frame inversion, a data polarity corresponding to left-eye data frames L and a data polarity corresponding to right-eye data frames R are continuously maintained to be positive (+) so as to increase the DC image sticking. Furthermore, when the polarity of data is inverted according to 2 frame inversion, the data polarity corresponding to the left-eye data frames L is maintained to be positive (+) and the data polarity corresponding to the right-eye data frames R is maintained to be negative (−) to increase the DC image sticking. However, when the polarity of data is inverted according to 4 frame inversion, the data polarity corresponding to the left-eye data frames L and the data polarity corresponding to the right-eye data frames R are inverted for every four frames, and thus the DC image sticking is remarkably reduced.

The gate driver 60 generates a scan pulse signal in response to the gate control signal GDC and sequentially provides the scan pulse signal to gate lines of the LCD panel 70.

The LCD panel 70 includes two glass substrates and a liquid crystal layer formed between the two glass substrates. The data lines and the gate lines intersecting the data lines are formed on the lower glass substrate of the LCD panel 70. Liquid crystal cells are arranged in a matrix form in the LCD panel 70 according to the intersecting structure of the data lines and the gate lines. A black matrix, a color filter, and a common electrode of the liquid crystal cells are formed on the upper glass substrate of the LCD panel 70. The common electrode is formed on the upper glass substrate in a vertical field driving mode such as twisted nematic (TN) mode and vertical alignment (VA) mode and formed together with pixel electrodes on the lower glass substrate in a horizontal field driving mode such as in-plane switching (IPS) mode and fringe field switching (FFS) mode. Polarizers are respectively attached to the upper and lower glass substrates of the LCD panel 70 and an alignment film for setting a pretilt angle of liquid crystal is formed between the inner sides of the upper and lower glass substrates, which come into contact with the liquid crystal.

The back light unit 80 includes light sources turned on according to driving power supplied from a light source driver (not shown), a light guide (or diffuser), and optical sheets. The back light unit 80 may be of direct type or edge type. The light sources may include one or more than two of a hot cathode fluorescent lamp (HCFL), a cold cathode fluorescent lamp (CCFL), an external electrode fluorescent lamp (EEFL), and a light emitting diode (LED). The back light unit 80 may be omitted when the image display device is a reflective LCD.

The liquid crystal shutter glasses 90 operate in the 3D mode and include a left-eye shutter STL and a right-eye shutter STR, which are electrically individually controlled. Each of the left-eye shutter STL and the right-eye shutter STR includes a first transparent substrate, a first transparent electrode formed on the first transparent substrate, a second transparent substrate, a second transparent electrode formed on the second transparent substrate, and a liquid crystal layer interposed between the first and second transparent substrates.

The first transparent electrode is provided with a reference voltage and the second transparent electrode is provided with ON/OFF voltage. The left-eye shutter STL and the right-eye shutter STR transmit light from the LCD panel 70 when the ON voltage is supplied to the second transparent electrode and block the light from the LCD panel 70 when the OFF voltage is applied to the second transparent electrode.

As described above, the image display device and the driving method thereof according to the present invention can ODC-modulate data of the nth frame (left-eye/right-eye data frame) in relation to the (n−1)th frame (reset frame) with reference to gray-scale information of the (n−2)th frame (right-eye/left-eye data frame), which is reflected in the (n−1)th frame, such that a data compensation range can be flexibly varied according to the gray-scale information of the (n−2)th frame. Accordingly, 3D crosstalk can be effectively removed without generating a luminance deviation when a 3D image is generated.

Furthermore, the image display device and the driving method thereof according to the present invention can remarkably reduce DC image sticking when BDI is applied to 3D images by inverting the polarity of data according to N frame inversion (N is a multiple of 4).

What is claimed is:

1. A method of driving an image display device, the method comprising:
    inserting a reset frame displaying black data between neighboring data frames alternately displaying left-eye data and right-eye data;
    reflecting gray-scale information of an (n−2)th data frame in a reset frame corresponding to an (n−1)th frame through a predetermined data calculating operation;
    detecting a data variation between the (n−1)th reset frame and an nth data frame, reading a compensation value corresponding to the detection result from a lookup table, and modulating input data of the nth data frame using the read compensation value; and
    inverting the polarity of the modulated data according to N frame inversion (N is a multiple of 4) and applying the data having the inverted polarity to a display panel,
    wherein the gray-scale information reflected in the (n−1)th reset frame is calculated as a gray-scale value corresponding to 1/k (k is a positive integer greater than 2) or 1/j (j is a positive integer greater than 4) of the input gray-scale value of the (n−2)th data frame in the data calculating operation, and
    wherein each of the 1/k and the 1/j defines a data accessible region in the lookup table.

2. The method of claim 1, wherein the data of the data frame is calculated as a gray-scale value obtained by adding a predetermined gray-scale shift value to 1/k of the input gray-scale value when the gray-scale information reflected in the (n−1)th reset frame is calculated as a gray-scale value corresponding to the 1/j of the input gray-scale value of the (n−2)th data frame in the data calculating operation.

3. The method of claim 1, wherein the modulating of the input data of the nth data frame comprises:
    selecting a first region of the lookup table, which is defined as a data accessible region, through the data calculating operation and ODC-modulating input data corresponding to the nth data frame by using compensation values included in the first region when the current frame corresponds to the nth data frame; and
    selecting a second region of the lookup table, which is defined as a data accessible region, through the data calculating operation and modulating the data reflected in the (n−1)th reset data into a black gray scale by using a compensation value included in the second region when the current frame corresponds to the (n−1)th reset frame.

4. The method of claim 3, wherein the compensation value included in the second region corresponds to a minimum gray-scale value.

5. The method of claim 3, wherein the first region is located in the left half of the lookup table and the second region is located in the upper half of the lookup table.

6. The method of claim 3, wherein the first region is located in part of the left side of the lower half of the lookup table, the second region is located in part of the right side of the upper half of the lookup table, and the first region is not overlapped with non-modulation regions arranged in a diagonal direction and at the bottom in the lookup table and the second region.

7. An image display device, comprising:
    a 3D processor inserting a reset frame displaying black data between neighboring data frames alternately displaying left-eye data and right-eye data;
    a calculating unit reflecting gray-scale information of an (n−2)th data frame in a reset frame corresponding to an (n−1)th frame through a predetermined data calculating operation;
    a data modulator detecting a data variation between the (n−1)th reset frame and an nth data frame, reading a compensation value corresponding to the detection result from a lookup table, and modulating input data of the nth data frame using the read compensation value; and
    a data driver inverting the polarity of the modulated data according to N frame inversion (N is a multiple of 4) and applying the data having the inverted polarity to a display panel,
    wherein the calculating unit calculates the gray-scale information reflected in the (n−1)th reset frame as a gray-scale value corresponding to 1/k (k is a positive integer greater than 2) or 1/j (j is a positive integer greater than 4) of the input gray-scale value of the (n−2)th data frame, and
    wherein each of the 1/k and the 1/j defines a data accessible region in the lookup table.

8. The image display device of claim 7, wherein the calculating unit calculates the data of the data frame as a gray-scale value obtained by adding a predetermined gray-scale shift value to 1/k of the input gray-scale value through the data calculating operation when the gray-scale information reflected in the (n−1)th reset frame is calculated as a gray-scale value corresponding to the 1/j of the input gray-scale value of the (n−2)th data frame in the data calculating operation.

9. The image display device of claim 7, wherein the data modulator selects a first region of the lookup table, which is defined as a data accessible region, through the data calculating operation and ODC-modulates input data corresponding to the nth data frame by using compensation values included in the first region when the current frame corresponds to the nth data frame; and selects a second region of the lookup table, which is defined as a data accessible region, through the data calculating operation and modulates the data reflected in the (n−1)th reset data into a black gray scale by using a compensation value included in the second region when the current frame corresponds to the (n−1)th reset frame.

10. The image display device of claim 9, wherein the compensation value included in the second region corresponds to a minimum gray-scale value.

11. The image display device of claim 9, wherein the first region is located in the left half of the lookup table and the second region is located in the upper half of the lookup table.

12. The image display device of claim 9, wherein the first region is located in part of the left side of the lower half of the lookup table, the second region is located in part of the right side of the upper half of the lookup table, and the first region is not overlapped with non-modulation regions arranged in a diagonal direction and at the bottom in the lookup table and the second region.

* * * * *